United States Patent [19]

Dauguet et al.

[11] 4,222,747

[45] Sep. 16, 1980

[54] POLISHING MATERIAL FOR OPHTHALMIC LENSES

[75] Inventors: Jean-Claude Dauguet, Ozoir-la-Ferrière; Jean-Pierre Mazzone, Villiers-sur-Marne; Pierre Moreau, Saint-Maur, all of France

[73] Assignee: Essilor International, Cie Generale d'Optique, Creteil, France

[21] Appl. No.: 973,725

[22] Filed: Dec. 27, 1978

[30] Foreign Application Priority Data

Jan. 5, 1978 [FR] France .................................. 78 00189

[51] Int. Cl.$^2$ .............................................. C09K 3/14
[52] U.S. Cl. ............................................ 51/301; 51/302; 51/303; 106/4; 106/5; 252/174.15; 252/174.16; 252/174.25
[58] Field of Search ................. 51/303, 304, 305, 306, 51/302; 106/4, 5, 6; 252/174.15, 174.16, 174.25

[56] References Cited

U.S. PATENT DOCUMENTS

| | | | |
|---|---|---|---|
| 2,865,725 | 12/1958 | Schroeder et al. | 51/305 |
| 3,053,646 | 9/1962 | Roth | 51/298 |
| 3,141,273 | 7/1964 | Sarofeen | 51/298 |
| 3,715,842 | 2/1973 | Tredinnick et al. | 51/303 |
| 3,817,727 | 6/1974 | Yancey | 51/309 |
| 4,071,333 | 1/1978 | Like | 51/304 |

FOREIGN PATENT DOCUMENTS 1519396  8/1970  Fed. Rep. of Germany ............. 51/303

*Primary Examiner*—Donald J. Arnold
*Attorney, Agent, or Firm*—Charles E. Brown

[57] ABSTRACT

The invention relates to a polishing material of the type containing powdered cerium oxide suspended in water.

According to the invention, this polishing material also contains, in combination, a substance for use as a thickener and a substance for reducing the surface tension.

The polishing material is particularly useful for polishing ophthalmic lenses made from organic materials.

7 Claims, No Drawings

POLISHING MATERIAL FOR OPHTHALMIC LENSES

BACKGROUND OF THE INVENTION

This invention relates to polishing materials in general and more particularly to materials suitable for polishing ophthalmic lenses made from organic materials.

These polishing materials usually consist of a powdered abrasive product suspended in any suitable liquid carrier such as water or alcohol.

In practice, these abrasive products themselves are made up of one or more oxides, together with adjuvants for producing a substantial improvement in the qualities of the oxides.

The oxides most frequently used at present are as follows: aluminium or corundum oxide, stannic oxide, titanium dioxide, zirconium oxide, chromium oxide, two iron oxides ($Fe_2O_3$ and $Fe_3O_4$), magnesium oxide or magnesia, zinc oxide and manganese oxide.

Using oxides of this kind for abrasive products, quality of the polish obtained on ophthalmic lenses made from organic materials is always relatively poor; it never approaches the quality of the polish obtained on ophthalmic lenses made from mineral materials.

Better results are now being obtained by using a rare earth metal oxide and, in particular, cerium oxide, as the abrasive product.

However, the mere use of a rare earth metal oxide in solution in water, with no other form of preparation, still only gives relatively imperfect polishing qualities, when used for polishing ophthalmic lenses made from organic materials, and numerous streaks and specks are left on the surface of the treated lenses, chiefly because of the relatively low hardness of the constituent material of the lenses.

To improve the quality of polishing, it has been proposed in German patent application No. 25 09 871 to carry out granulometric selection of the powdered cerium oxide which is to be suspended in water and to add various adjuvants, more particularly glycerine, to this suspension.

The adjuvants proposed hitherto do result in a certain improvement in the polishing qualities obtained for the surfaces treated.

However, when it comes to ophthalmic lenses made from organic materials, these polishing qualities are still not sufficiently good for it to be possible to apply subsequent surface treatments to these ophthalmic lenses under satisfactory conditions, e.g. anti-reflecting or anti-abrasion treatments, which demand that the lens has a very highly polished surface in order to have a uniform effect over the whole lens, which is, of course, absolutely essential.

Moreover, the cerium oxide-based polishing materials proposed hitherto result in excessively long polishing operations when used for polishing ophthalmic lenses made from organic materials.

Finally, these polishing materials are not stable over long periods. They are subject to settling resulting in reagglomeration, forming a solid deposit of the particles of cerium oxide which were originally in suspension, and this leads, on the one hand, to irreversible degradation of the suspension and, on the other hand, to deterioration in the quality of polishing obtained with the suspension.

SUMMARY OF THE PRESENT INVENTION

This invention relates to a cerium oxide-based polishing material which does not have these drawbacks, and is, in particular, very stable.

It is based on the discovery that it is possible to stabilise a suspension of cerium oxide in water permanently by adding both a substance acting as a thickener and a substance acting to reduce the surface tension.

According to the present invention there is provided a polishing material of the type containing powdered cerium oxide in suspension in water; this polishing material is characterised in that it also contains a combination of a thickening substance and a surface tension reducing substance.

Although it is not possible, at least for the present, to determine the precise way in which the combination works, it appears from the tests made that the substances used according to the invention are effective by their joint presence: the results obtained are not as good when only one of the substances is used, and all the signs indicate that, from the results mentioned above, a synergic effect develops between them.

DESCRIPTION OF THE PRESENT INVENTION

The substance acting as the thickener may be one of many. Preferably, it comprises at least one of the following products or a mixture thereof:
 carboxymethylcellulose;
 ethylcellulose;
 methylcellulose;
 polyvinyl alcohol of any grade;
 sodium polyacrylate;
 methylene polyoxide;
 carboxypolymethylene;
 polyvinylpyrrolidone;
 casein;
 gum arabic.

Preferably, the substance used for thickening is added in a quantity of 0.1 to 15% by weight, based on the cerium oxide, whatever the dilution of the polishing material in question; for a dilution corresponding to a normal form of use of this material, this thickener is preferably added in a quantity of 0.1 to 5% of the total.

The substance for reducing the surface tension may also be one of many.

In particular, it is not necessarily selected from the products recognised as having surface active properties with regard to water.

Preferably, the substance for reducing the surface tension comprises at least one of the following products or a mixture thereof:
 alkali salts, particularly potassium or sodium salts;
 silicones and particularly emulsions of polysiloxanes.

The alkali salts which have been found to be particularly satisfactory are as follows:
 alkylarylsulphonate;
 lauryl sulphonate;
 dodecyl sulphonate;
 dodecyl sulphate;
 lauryl ether sulphate;
 dioctyl sulphosuccinate;
 dihexyl sulphosuccinate;
 diamyl sulphosuccinate;
 phosphoric acid polyesters.

Preferably the substance used for reducing the surface tension is used in a quantity of 0.1% by weight, based on the cerium oxide, whatever the dilution of the polishing material in question; for a dilution corresponding to a normal form of use of this material, it is preferably used in a quantity of 0.1 to 3% by weight of the total.

An embodiment of a polishing material of the present invention has, in condition for use, the following overall formulation:
- 30 to 70% cerium oxide;
- 35 to 65% water;
- 0.1 to 5% of a thickening substance; and
- 0.1 to 3% of a surface tension reducing substance.

However, and this is a particular advantage of the polishing material according to the invention, this material may be in the form of a paste to be diluted before use.

The initial water content is thus less.

In any case, the powdered cerium oxide used preferably has a particle size of between 1 and 50 microns.

The polishing material according to the invention may be prepared by the following method, for example:
- dissolving the thickening substance and the surface tension reducing substance in water;
- mechanically dispersing the powdered cerium oxide in this solution, for example, by using a stirrer;
- filtering the resulting suspension to obtain the desired particle size;
- and again mechanically dispersing the filtered product in the water for example, by using a stirrer.

However, it is obvious that other methods may be used.

DESCRIPTION OF PREFERRED EXAMPLES

Various formulations which have been found satisfactory will now be given by way of example.

These formulations are given for a normal diluted form of use, whilst it should be understood that, as explained above, the water content may be reduced in order to obtain the product in paste form so as to reduce the transporting and storage costs.

EXAMPLE 1

| cerium oxide | 60% |
|---|---|
| water | 38.95% |
| polyvinyl alcohol | 0.55% |
| sodium laurylether sulphate | 0.5% |

EXAMPLE 2

| cerium oxide | 50% |
|---|---|
| water | 48.95% |
| polyvinyl alcohol | 0.55% |
| potassium laurylether sulphate | 0.5% |

EXAMPLE 3

| cerium oxide | 55% |
|---|---|
| water | 44% |
| sodium polyacrylate | 0.6% |
| potassium salt of phosphoric acid polyester | 0.4% |

EXAMPLE 4

| cerium oxide | 60% |
|---|---|
| water | 39.2% |
| soda | 0.6% |

-continued

| sodium dioctylsulphosuccinate | 0.2% |
|---|---|

With these formulations, the viscosity of the water is multiplied by about 2.5 under the effect of the thickening substance.

As for the surface tension of the water, it is reduced to about 49 dyn/cm by the thickening substance and to about 32 dyn/cm by the surface tension reducing substance.

In any case, the results obtained with these formulations are excellent, particularly for polishing ophthalmic lenses made of organic materials: the quality of the polish on the treated surfaces is very good and enables any desired subsequent treatment, such as an anti-abrasion or anti-reflecting treatment, to be applied to these surfaces.

Moreover, these formulations are stable: they can therefore be stored without deteriorating.

In addition, they are used in exactly the same way as the conventional polishing materials and, in particular, they can be used in any machine for treating the surface of ophthalmic lenses.

Finally, they reduce the polishing time by at least 10% compared with the time taken using known polishing materials based on cerium oxide.

However, it goes without saying that the invention is not restricted to these formulations but covers all variants.

It is also obvious that its field of application is not limited to the polishing of ophthalmic lenses made of organic materials but also extends to the polishing of all other articles.

We claim:

1. Polishing material, particularly for ophthalmic lenses made of organic material, consisting essentially of, by weight:
   - 30 to 70% cerium oxide;
   - 35 to 65% water; and
   - 0.1 to 5% of a thickening substance;
   - 0.1 to 3% of a surface tension reducing substance.

2. Polishing material according to claim 1, wherein said cerium oxide has a particle size in the range of 1 to 50 microns.

3. Polishing material according to claim 1 wherein the amount by weight of said cerium oxide generally corresponds to the amount of said water.

4. Polishing material according to claim 1 wherein the quantity of said thickening substance is such that the viscosity of said water containing said thickening agent is multiplied by about 2.5.

5. Polishing material according to claim 1, wherein the substance acting as the thickener is selected from the group consisting of:
   carboxymethylcellulose; ethylcellulose; methylcellulose; polyvinyl alcohol; sodium polyacrylate; methylene polyoxide; carboxypolymethylene; polyvinylpyrrolidone; casein; and gum arabic.

6. Polishing material according to claim 5 or 1, wherein the substance for reducing the surface tension is selected from the group consisting of:
   alkylaryl sulphonate; lauryl sulphonate; dodecyl sulphonate; dodecyl sulphate; lauryl ether sulphate; dioctyl sulphosuccinate; dihexyl sulphosuccinate; diamyl sulphosuccinate; phosphoric acid polyesters; silicones; and emulsions of polysiloxanes.

7. Polishing material according to claim 1, wherein the substance acting as thickener and the substance for reducing the surface tension are used in substantially the same proportions.

* * * * *